United States Patent
Hamada et al.

(10) Patent No.: US 6,914,735 B2
(45) Date of Patent: Jul. 5, 2005

(54) MANUFACTURING METHOD FOR MAGNETIC RECORDING MEDIUM, AND MASTER INFORMATION CARRIER USED THEREFOR

(75) Inventors: Taizou Hamada, Osaka (JP); Tatsuaki Ishida, Shiga (JP); Yasuaki Ban, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 121 days.

(21) Appl. No.: 10/261,673

(22) Filed: Oct. 2, 2002

(65) Prior Publication Data
US 2003/0068462 A1 Apr. 10, 2003

(30) Foreign Application Priority Data
Oct. 4, 2001 (JP) .................................... P2001-308611

(51) Int. Cl.[7] ................................................ G11B 5/86
(52) U.S. Cl. ................. 360/17; 428/694 R; 428/694 T; 428/65.3
(58) Field of Search ............... 360/16, 17; 428/694 SG, 428/694 TR, 65.3, 694 NM, 694 R, 694 T; 427/127; G11B 5/84, 5/86

(56) References Cited

FOREIGN PATENT DOCUMENTS

| JP | 10-40544 | | 2/1998 | | |
| JP | 10040544 A | * | 2/1998 | ............ | G11B/5/86 |
| JP | 10269566 A | * | 10/1998 | ............ | G11B/5/84 |

* cited by examiner

Primary Examiner—David Hudspeth
Assistant Examiner—Dan I Davidson
(74) Attorney, Agent, or Firm—McDermott Will & Emery LLP

(57) ABSTRACT

In a manufacturing method for a magnetic recording medium, when the length of a ferromagnetic thin film on a master information carrier corresponding to the length between a pair of magnetization transition regions adjacent to each other is A in magnetization information recorded onto a magnetic recording medium, the film thickness of the ferromagnetic thin film is t and A/t is k, k is set from not less than 0.8 to not more than 8.

7 Claims, 9 Drawing Sheets

CIRCUMFERENTIALLY SPACED
DISTANCE B = 2 μm
FILM THICKNESS t
     = 200 nm
APPLIED MAGNETIC FIELD
INTENSITY = 1000 Oe
CIRCUMFERENTIAL
  LENGTH A
    ① = 0.25 μm
    ② = 0.50 μm
    ③ = 1.00 μm
    ④ = 1.50 μm

US 6,914,735 B2

MANUFACTURING METHOD FOR MAGNETIC RECORDING MEDIUM, AND MASTER INFORMATION CARRIER USED THEREFOR

FIELD OF THE INVENTION

The present invention relates to a manufacturing method for a magnetic recording medium which magnetically transfers an information signal to a magnetic recording medium from a master information carrier in close physical contact of the master information carrier with the magnetic recording medium. The master information carrier is provided on its surface with a plurality of fine ferromagnetic thin films at predetermined intervals in the circumferential direction in accordance with a pattern corresponding to the information signal.

BACKGROUND OF THE INVENTION

Onto a magnetic recording medium used in a magnetic recording/reproducing device, an information signal required for tracking servo and other controls is generally pre-format recorded.

As such a pre-format recording technique for the information signal onto the magnetic recording medium, there is known a technique for making contact the surface of a master information carrier formed with ferromagnetic thin films in accordance with a pattern corresponding to the information signal with the surface of a magnetic recording medium onto which the information signal is to be magnetically transferred so as to magnetically transfer the information signals all together from the master information carrier to the magnetic recording medium (see Japanese Unexamined Patent Publication No. 10-40544 (1998)).

In the case of a magnetic recording medium subjected to magnetic transfer by means of the above-described magnetic transfer technique, the reproducing level of an information signal for scanning of a magnetic head is low. In some cases, the magnetic head may cause a tracking error and other disadvantages.

SUMMARY OF THE INVENTION

Accordingly, a main object of the present invention is to provide a manufacturing method for a magnetic recording medium capable of performing satisfactory magnetic transfer of an information signal from a master information carrier to the magnetic recording medium.

Other objects, features and advantages of the present invention will be apparent from the later description.

In summary, the present invention includes the steps of: making contact a master information carrier having a plurality of ferromagnetic thin films in the form of an information signal provided adjacent to each other at predetermined intervals in the circumferential direction with a magnetic recording medium onto which the information signal is magnetically transferred; and allowing a leakage flux between the adjacent ferromagnetic thin films in the circumferential direction caused by an applied magnetic field to the master information carrier to magnetize the magnetic recording medium in the direction of the applied magnetic field so as to form magnetization transition regions in the circumferential direction in the magnetic recording medium, wherein when the circumferential length of the ferromagnetic thin film on the master information carrier is A, the film thickness of the ferromagnetic thin film is t and A/t is an aspect ratio, the aspect ratio is set so that an effective transfer magnetic field corresponding to a magnetic material constructing the ferromagnetic thin film is not less than 1000 oersteds.

Preferably, the aspect ratio is set from not less than 0.8 to not more than 8.0.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF PREFERRED EMBODIMENTS

Figure 1:
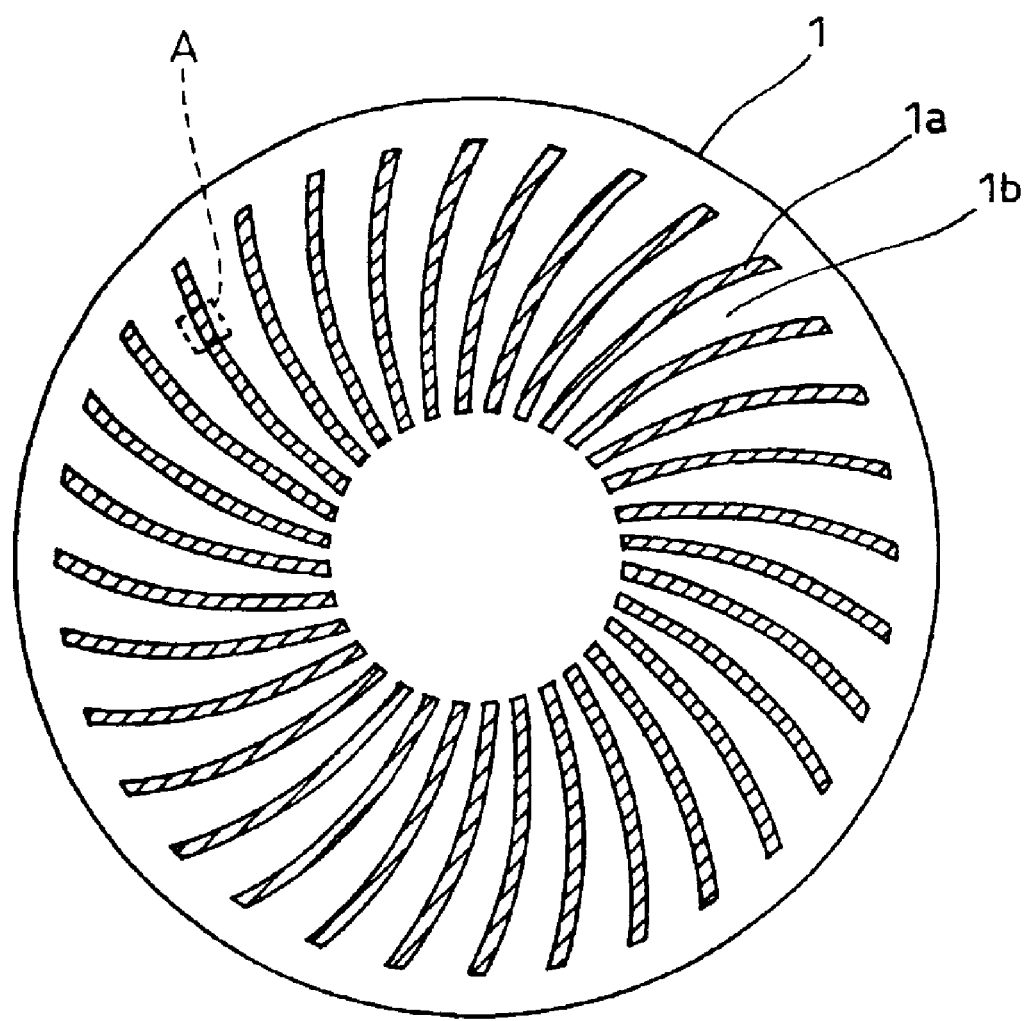
FIG. 1 is a plan view of a master information carrier used in a manufacturing method for a magnetic recording medium according to a preferred embodiment of the present invention.

Referring to FIG. 1, a master information carrier 1 used in a magnetic transfer method according to a preferred embodiment of the present invention is shown in a state that its magnetic transfer surface is faced. The master information carrier 1 has a circular planar shape.

The magnetic transfer surface of the master information carrier 1 has a plurality of transfer regions 1a and a plurality of non-transfer regions 1b. Each of the transfer regions 1a is formed by the arrangement pattern of the ferromagnetic thin film corresponding to an information signal to be magnetically transferred onto a magnetic recording medium and is constructed radially from the inner circumference to the outer circumference. The non-transfer regions 1b are constructed so as to be positioned between the circumferential directions of the transfer regions 1a, respectively.

Figure 2:
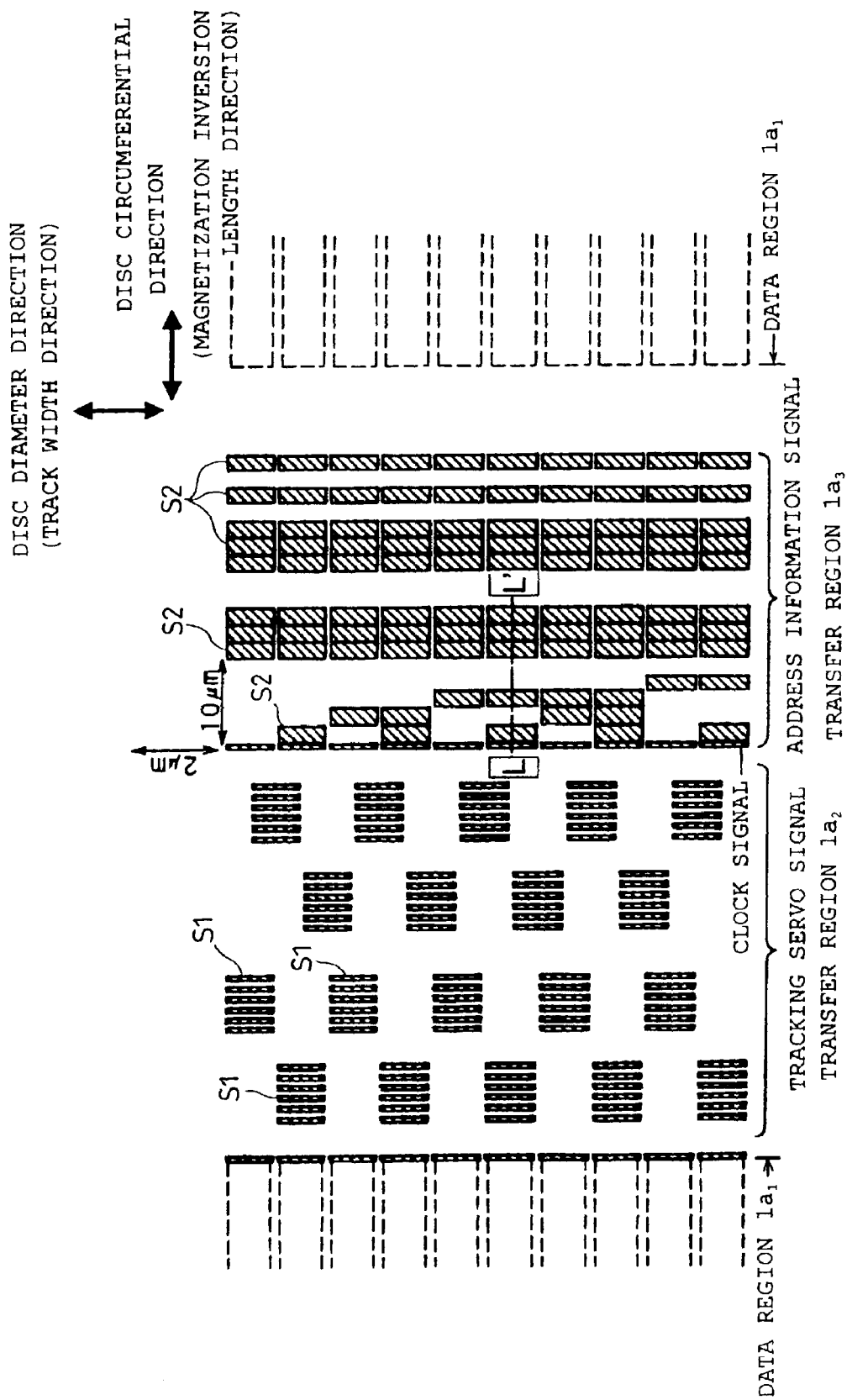
FIG. 2 is an enlarged view of A part of the master information carrier shown in FIG. 1.

Referring to FIG. 2, the configuration of a square part enclosed by broken line A of the master information carrier 1 shown in FIG. 1 will be described. FIG. 2 is an enlarged view of the square part.

The ferromagnetic thin film is formed on the transfer region 1a shown in FIG. 1 in accordance with an information signal. FIG. 2 shows the ferromagnetic thin film with hatching. In FIG. 2, the diameter direction (the track width direction) and the circumferential direction (the magnetization inversion length direction) of the master information carrier 1 are indicated by arrow marks. In the figure, the length units of 2 $\mu$m and 10 $\mu$m for indicating the size of the square part A are described.

The transfer region 1a also has, in the track length direction, a region $1a_1$ for data recording for transferring a region for data recording, a region $1a_2$ for transferring a servo signal S1 for tracking, and a region $1a_3$ for transferring an address information signal S2 including a reproducing clock signal. The signals S1 and S2 are typically indicated as an information signal.

In a magnetic recording/reproducing device, because of reproduction at a satisfactory S/N ratio of a signal recorded onto a track of the magnetic recording medium, the magnetic head must be scanned precisely on the track. An information signal is arranged at fixed intervals in the circumferential direction of the master information carrier 1 and is used as a reference signal in order for the magnetic head to precisely scans a narrow track in a disc while checking and correcting its own position.

Figure 3:
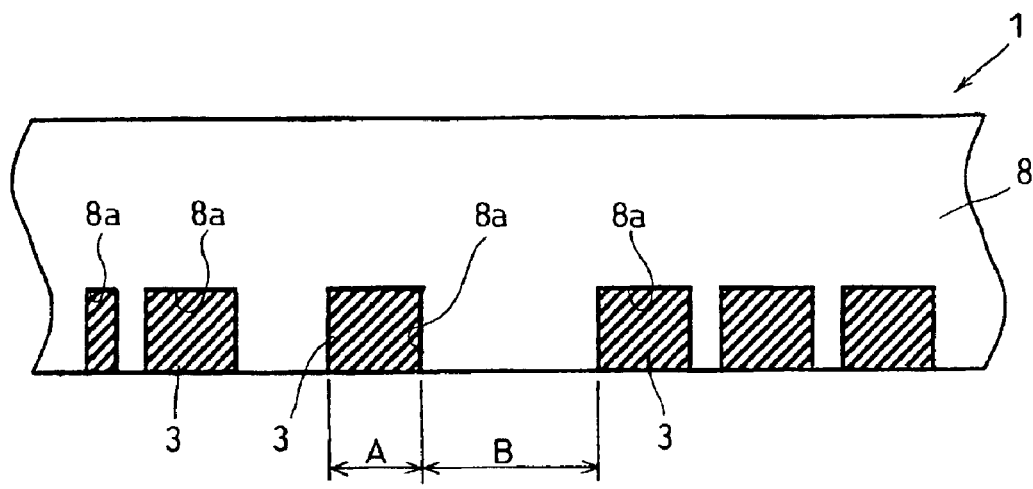
FIG. 3 is a cross-sectional view taken along line L–L' of the master information carrier shown in FIG. 2.

Referring to FIG. 3, the arrangement of ferromagnetic thin films 3 of the master information carrier 1 will be described. FIG. 3 shows the cross-sectional structure of the master information carrier 1 taken along chain line L–L' shown in FIG. 2. The chain line L–L' corresponds to the circumferential direction of the master information carrier 1. The horizontal direction in the paper in FIG. 3 corresponds with the time axis direction of an information signal at the reproduction of the information signal by the magnetic head.

The master information carrier 1 has a non-magnetic substrate 8 having a surface layer part. The surface layer part of the non-magnetic substrate 8 is provided with concave parts 8a corresponding to the arrangement pattern (corresponding to a magnetization pattern recorded onto the magnetic recording medium 2) of the ferromagnetic thin films 3. The ferromagnetic thin film 3 is buried into the concave part 8a.

The arrangement pattern of the ferromagnetic thin films 3 is determined by a circumferential direction length A of the ferromagnetic thin film 3 or a circumferentially spaced distance B of the ferromagnetic thin film 3 corresponding to a desired signal length in the magnetization pattern recorded onto the magnetic recording medium. The signal length means the length between a pair of magnetization transition regions (regions in which the magnetization direction is transited) 6 adjacent each other in the magnetization pattern of the magnetic recording medium.

Referring to FIG. 4, the magnetic transfer method in accordance with this embodiment will be described.

Figure 4A:
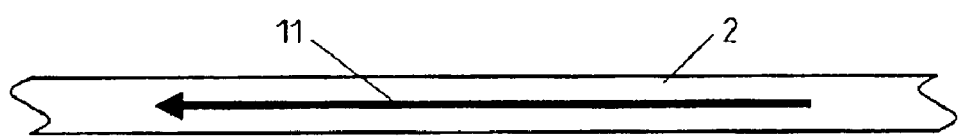
FIG. 4A is a partial cross-sectional view of a magnetic recording medium before magnetic transfer supplied for the description of the manufacturing method for a magnetic recording medium of the preferred embodiment of the present invention.
Figure 4B:
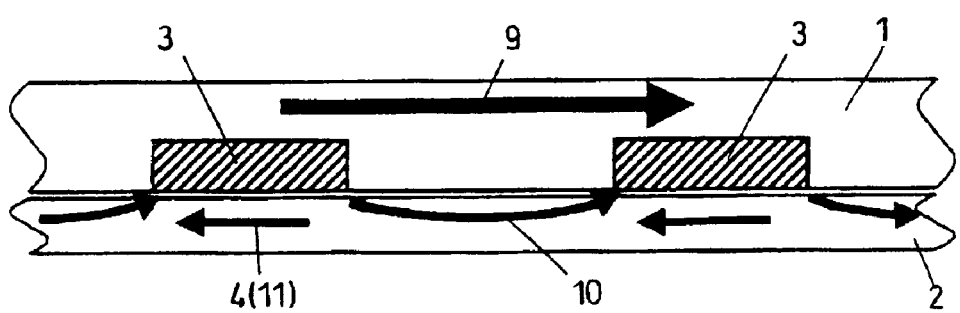
FIG. 4B is a partial cross-sectional view in a state of closely making contact the master information carrier with the magnetic recording medium corresponding to FIG. 4A.
Figure 4C:
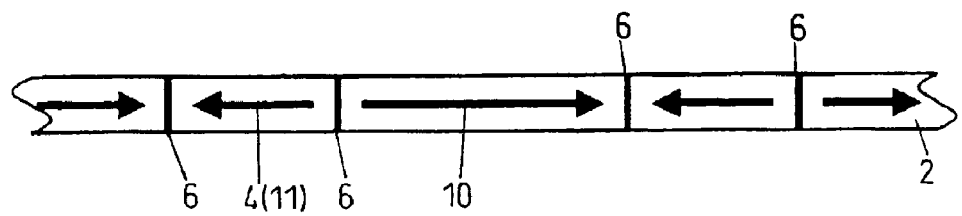
FIG. 4C is a partial cross-sectional view of the magnetic recording medium after magnetic transfer corresponding to FIG. 4A.

FIG. 4A shows the circumferential side of the magnetic recording medium 2 before magnetic transfer of an information signal. FIG. 4B shows the circumferential side in a state that the master information carrier 1 is closely made contact with the magnetic recording medium 2. FIG. 4C shows the circumferential side of the magnetic recording medium 2 after magnetic transfer of the information signal.

As shown in FIG. 4A, prior to close contact of the magnetic recording medium 2 with the master information carrier 1, the magnetic recording medium 2 is direct-current erased uniformly in the circumferential direction to be given initial magnetization 11 in the left direction in the figure (in one circumferential direction indicated by an arrow mark in the figure).

As shown in FIG. 4B, in a state that both the surfaces of the magnetic recording medium 2 and the master information carrier 1 are closely made contact (they are slightly spaced from each other in the figure for convenience in description), a magnetic field 9 is applied to the master information carrier 1 in the right direction in the figure (in the other circumferential direction indicated by an arrow mark in the figure). With the application, onto the magnetic recording medium 2, are recorded magnetization patterns arranged alternately via the magnetization transition regions 6 in which the magnetization direction is transited, as shown in FIG. 4C, by magnetization 4 due to remaining of the initial magnetization 11 and a leakage flux 10 from the master information carrier 1.

Figure 5:
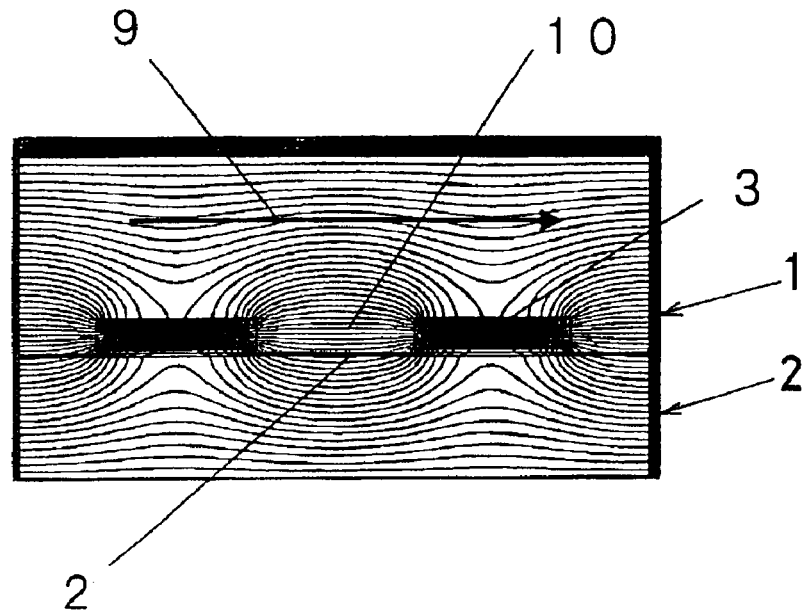
FIG. 5 is a diagram showing an example of a result obtained by computer simulating the flow of a magnetic flux between the master information carrier and the magnetic recording medium supplied for the description of the manufacturing method for a magnetic recording medium according to the preferred embodiment of the present invention.

FIG. 5 shows a result obtained by calculating the flow of a magnetic flux at the application of the magnetic field 9. To permit satisfactory signal reproduction by the magnetic head, the magnetization transition regions 6 must be clearly formed so as not to leak the magnetic flux immediately below the ferromagnetic thin film 3.

Figure 6A:
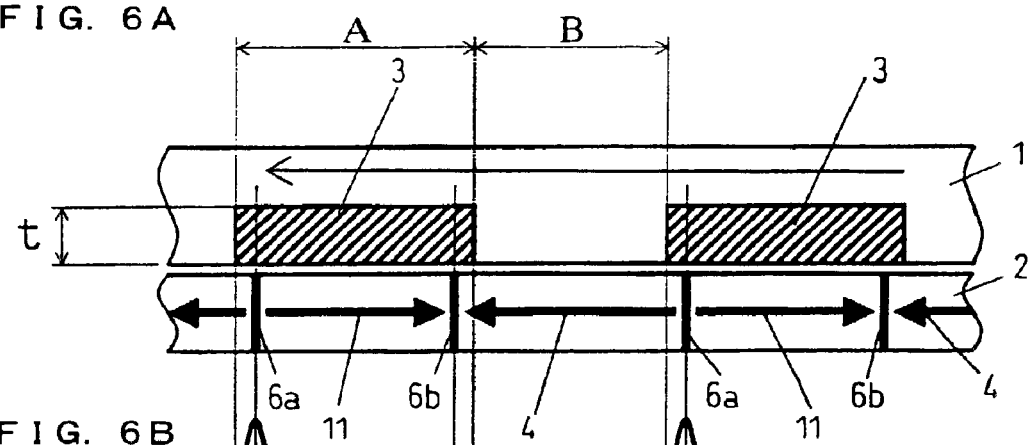
FIG. 6A is a partial cross-sectional view in a state of closely making contact the master information carrier with the magnetic recording medium supplied for the description of the manufacturing method for a magnetic recording medium according to the preferred embodiment of the present invention.
Figure 6B:
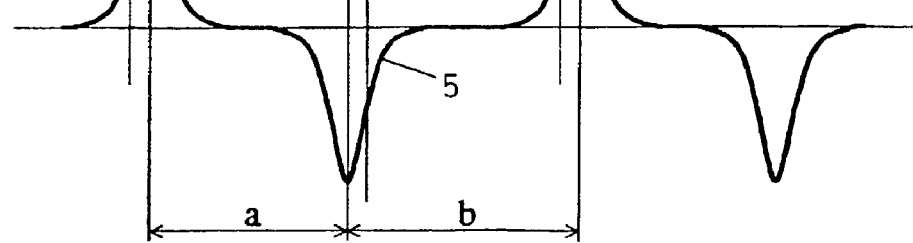
FIG. 6B is a diagram showing a signal waveform corresponding to FIG. 6A.

This will be described in greater detail with reference to FIG. 6. FIG. 6A shows the side cross-sections of the master information carrier 1 and the magnetic recording medium 2 which are in close contact with each other. FIG. 6B shows a reproducing waveform 5 of an information signal when the information signal in a magnetization pattern magnetically transferred onto the magnetic recording medium 2 is reproduced by a magnetic head.

In FIG. 6A, A indicates the circumferential length of the ferromagnetic thin film 3, B indicates the circumferentially spaced distance of the ferromagnetic thin film 3, and t indicates the film thickness of the ferromagnetic thin film 3.

In FIG. 6B, the level of the reproducing waveform 5 of the information signal is maximum on the positive side in a magnetization transition region 6a on the left side in the figure in the magnetic recording medium 2 appearing in the circumferential length A of the ferromagnetic thin film 3. The level of the reproducing waveform 5 of the information signal is maximum on the negative side in a magnetization transition region 6b on the right side in the figure.

In this embodiment, the circumferential length A, the circumferentially spaced distance B, and the film thickness t of the ferromagnetic thin film 3 of the master information carrier 1 are set to be in a specified relation so as to obtain a satisfactory magnetic transfer signal to the magnetic recording medium 2.

This will be described below.

Figure 7:
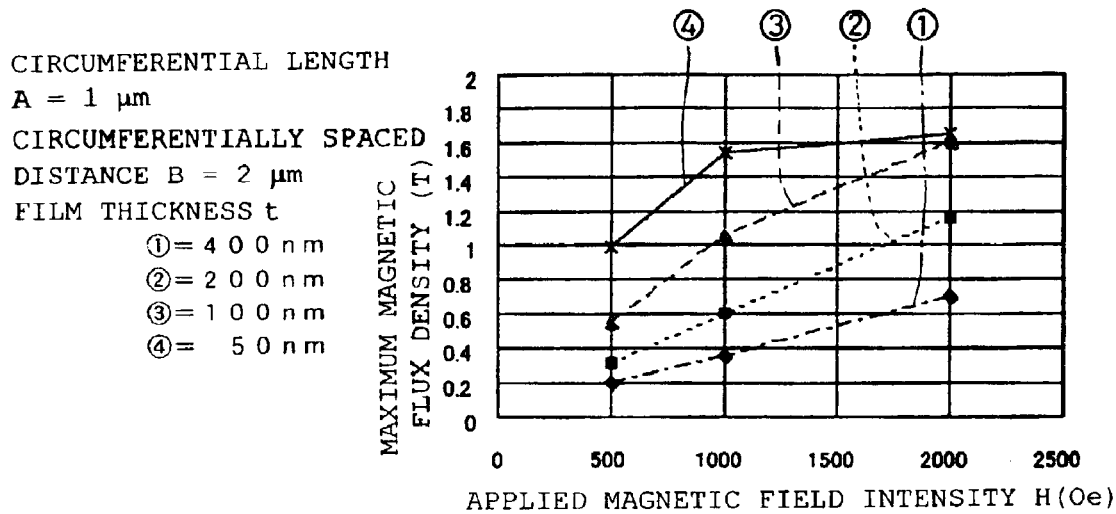
FIG. 7 is a diagram showing an example of results obtained by computer simulating magnetic flux densities and intensities inside a ferromagnetic thin film supplied for the description of the manufacturing method for a magnetic recording medium according to the preferred embodiment of the present invention.

(1) As shown in FIG. 7, when the circumferential length A and the circumferentially spaced distance B of the ferromagnetic thin film 3 of the master information carrier 1 are fixed, as the film thickness t is increased, an information signal can be satisfactorily magnetically transferred from the master information carrier 1 to the magnetic recording medium 2.

In FIG. 7, the horizontal axis indicates the intensity [H(Oe)] of the applied magnetic field 9 to the master information carrier 1 and the vertical axis indicates the maximum magnetic flux density (T) in the ferromagnetic thin film 3 of the master information carrier 1. The circumferential length A and the circumferentially spaced distance B of the ferromagnetic thin film 3 of the master information carrier 1 are fixed to be 1 $\mu$m and 2 $\mu$m, respectively.

As is apparent from these, the film thickness t of 400 nm indicates line ①, the film thickness t of 200 nm indicates line ②, the film thickness t of 100 nm indicates line ③, and the film thickness t of 50 nm indicates line ④. In the range of the intensity of 1000 to 2000 oersteds (Oe) of the applied magnetic field 9, as the film thickness t of the ferromagnetic thin film 3 of the master information carrier 1 is increased, the maximum magnetic flux density in the ferromagnetic thin film 3 is hard to be higher when the intensity of the applied magnetic field 9 is increased. In other words, the ferromagnetic thin film 3 of the master information carrier 1 is hard to magnetically saturate.

The surface region of the magnetic recording medium 2 is divided into a contact region (the region of the circumferential length A of FIG. 6) closely made contact with the ferromagnetic thin film 3 of the master information carrier 1 and a noncontact region (the region of the circumferentially spaced distance B of FIG. 6) between the adjacent ferromagnetic thin films 3 and not closely made contact with the ferromagnetic thin film 3 of the master information carrier 1. As the film thickness t of the ferromagnetic thin film 3 of the master information carrier 1 is increased, a magnetic flux is hard to flow from the ferromagnetic thin film 3 itself to the contact region of the surface of the magnetic recording medium 2. An information signal tends to satisfactorily magnetically transfer from the master information carrier 1 to the magnetic recording medium 2.

Figure 8:
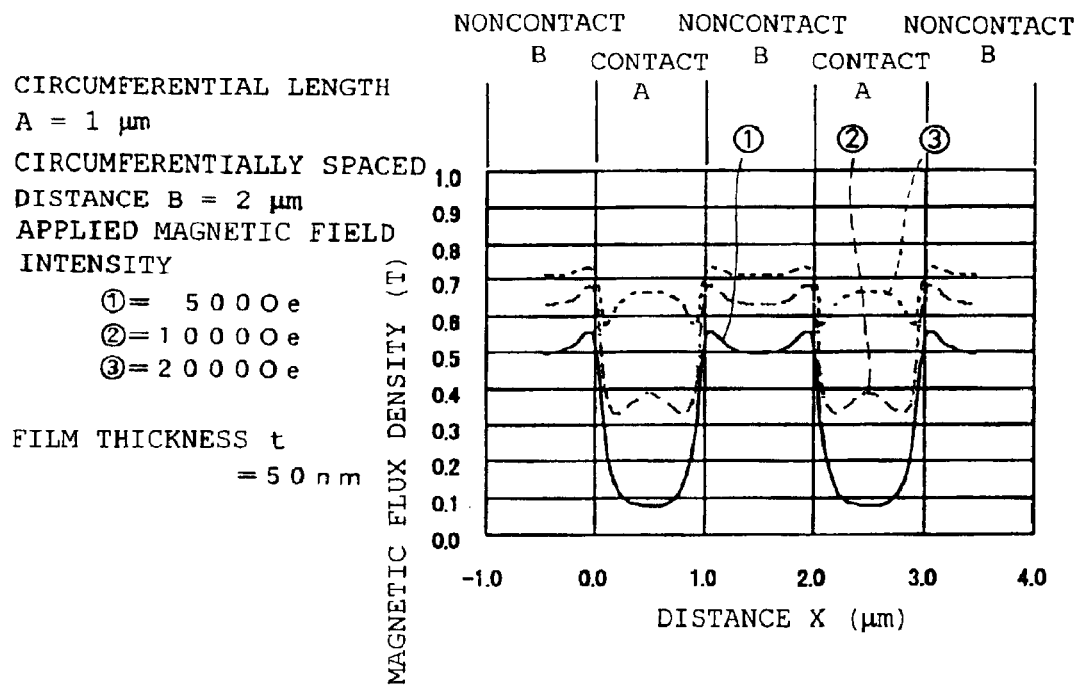
FIG. 8 is a diagram showing an example of results obtained by computer simulating magnetic flux density distributions of the surface of the ferromagnetic thin film supplied for the description of the manufacturing method for a magnetic recording medium according to the preferred embodiment of the present invention.
Figure 9:
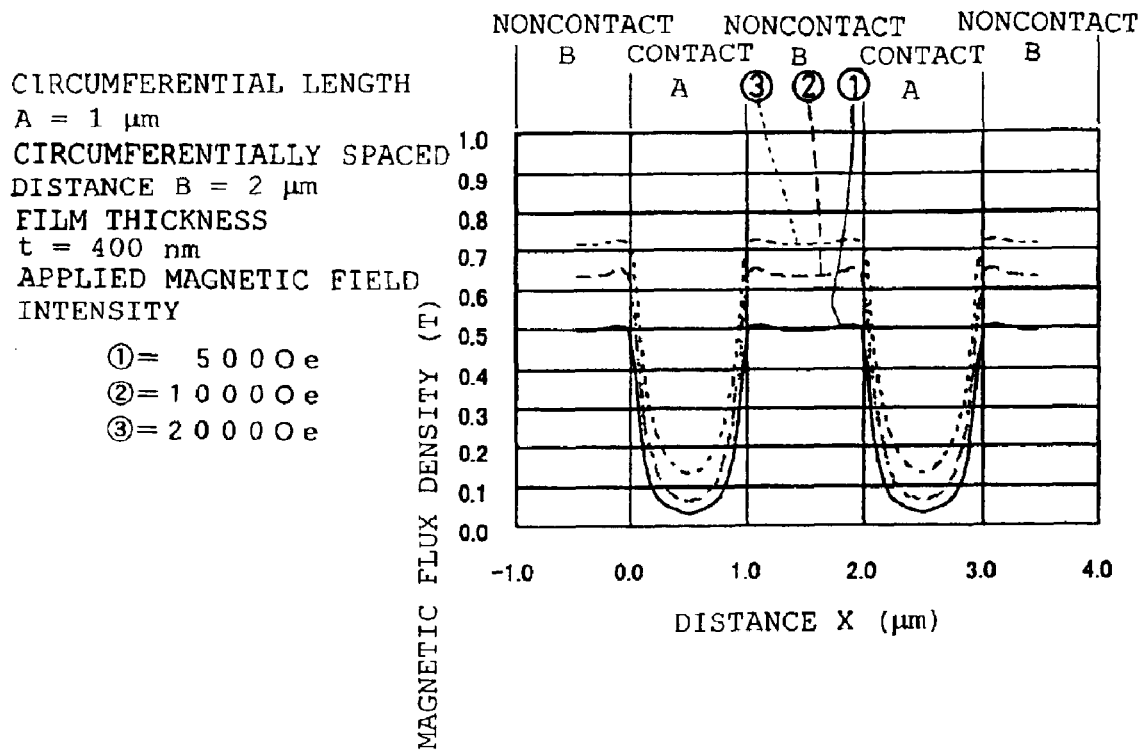
FIG. 9 is a diagram showing an example of results obtained by computer simulating magnetic flux density distributions of the surface of the magnetic recording medium supplied for the description of the manufacturing method for a magnetic recording medium according to the preferred embodiment of the present invention.

(2) FIGS. 8 and 9 show the magnetic flux densities of the surface of the magnetic recording medium 2 when the circumferential length (the contact region) A and the circumferentially spaced distance (the noncontact region) B of the ferromagnetic thin film 3 of the master information carrier 1 are fixed to be 1 $\mu$m and 2 $\mu$m, the film thickness t=50 nm and 400 nm, and with the respective film thicknesses t, the master information carrier 1 is closely contacted with the magnetic recording medium 2 so as to change the applied magnetic field 9 to 500 oersteds in line ①, 1000 oersteds in line ②, and 2000 oersteds in line ③. Here, in the horizontal axis of FIGS. 8 and 9, the range of 0.0 to 1.0 and the range of 2.0 to 3.0 indicate the contact region A and the range of −1.0 to 0.0, the range of 1.0 to 2.0 and the range of 3.0 to 4.0 indicate the noncontact region B.

As shown in FIG. 8, when the film thickness t of the ferromagnetic thin film 3 is small to be 50 $\mu$m and the applied magnetic field 9 is increased in line ①→line ②→line ③, the magnetic flux density of the contact region A of the magnetic recording medium 2 is increased so that the magnetic flux density of the noncontact region B is decreased. When the film thickness of the ferromagnetic thin film 3 is small, the magnetization transition regions 6 described in FIG. 4 cannot appear clearly in the magnetic recording medium 2. As a result, the output of the reproducing signal is small.

As shown in FIG. 9, when the film thickness t of the ferromagnetic thin film 3 is large to be 400 nm and the applied magnetic field 9 is increased in line ①→line ②→line ③, the magnetic flux density of the contact region A of the magnetic recording medium 2 is not increased very much. When the film thickness of the ferromagnetic thin film 3 is large, the clear magnetization transition regions 6 are formed in the magnetic recording medium 2. The output of the reproducing signal is large.

In FIGS. 8 and 9, when the contact region A and the noncontact region B of the ferromagnetic thin film 3 of the master information carrier 1 are the same, the larger film thickness t of the ferromagnetic thin film 3 increases the output of the reproducing signal.

Figure 10:
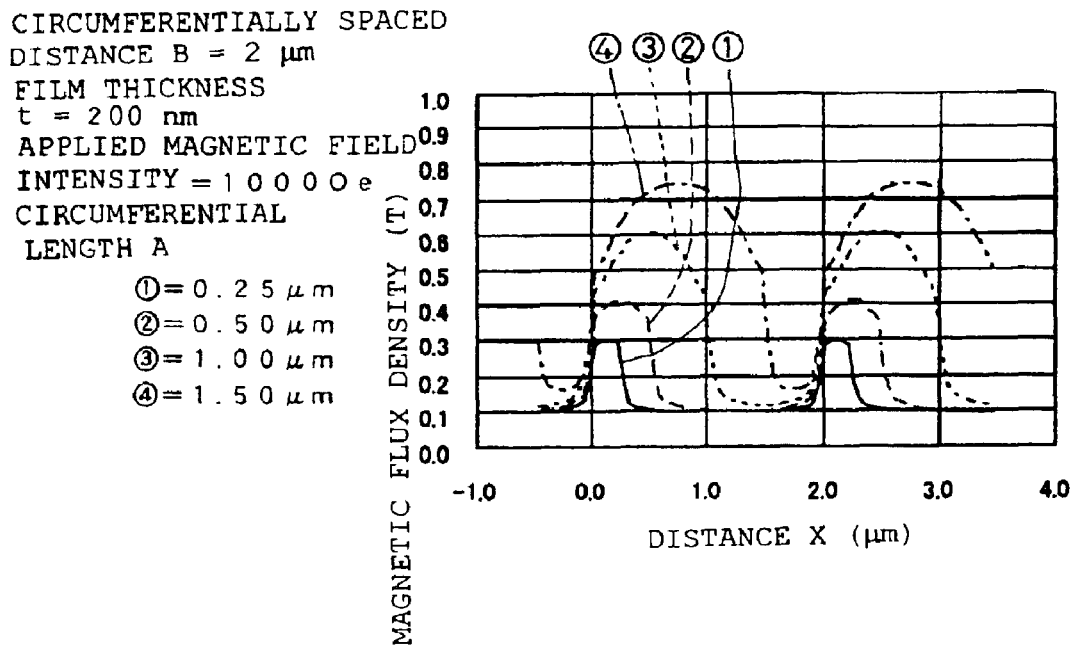
FIG. 10 is a diagram showing an example of results obtained by computer simulating magnetic flux density distributions of the surface of the master information carrier supplied for the description of the manufacturing method for a magnetic recording medium according to the preferred embodiment of the present invention.

(3) As shown in FIG. 10, when the film thickness t of the ferromagnetic thin film 3 of the master information carrier 1 is fixed, the longer circumferential length A of the ferromagnetic thin film 3 of the master information carrier 1 allows the ferromagnetic thin film 3 of the master information carrier 1 to be easy to magnetically saturate.

FIG. 10 shows the magnetic flux densities in the surface of the master information carrier 1 when in the master information carrier 1, the circumferentially spaced distance B is fixed to be 2 μm, the film thickness t of the ferromagnetic thin film 3 of the master information carrier 1 is fixed to be 200 nm, and the intensity of the applied magnetic field is fixed to be 1000 oersteds, so as to change the contact region length A. The horizontal axis and the vertical axis are the same as FIGS. 8 and 9.

In FIG. 10, the circumferential length A is increased sequentially in such a manner of: the circumferential length A=0.25 μm of the ferromagnetic thin film 3 in line ①, the circumferential length A=0.50 μm of the ferromagnetic thin film 3 in line ②, the circumferential length A=1.00 μm of the ferromagnetic thin film 3 in line ③, and the circumferential length A=1.50 μm of the ferromagnetic thin film 3 in chain line ④. The region in which the magnetic flux density is swollen in a mountain shape in FIG. 10 indicates the magnetic flux density in the ferromagnetic thin film 3.

As is apparent from FIG. 10, as the circumferential length A of the ferromagnetic thin film 3 is increased in line ①→line ②→line ③→line ④ even in the same magnetic field 9, the magnetic flux density in the ferromagnetic thin film 3 becomes high so that the ferromagnetic thin film 3 is easy to be magnetically saturated. As a result, the magnetization transition regions cannot be clear in the magnetic recording medium 2 below the ferromagnetic thin film 3 so that the output of the reproducing signal is small.

When the film thicknesses t of the ferromagnetic thin films 3 are the same, the shorter circumferential length A of the ferromagnetic thin film 3 makes the reproducing signal output satisfactory.

Figure 11:
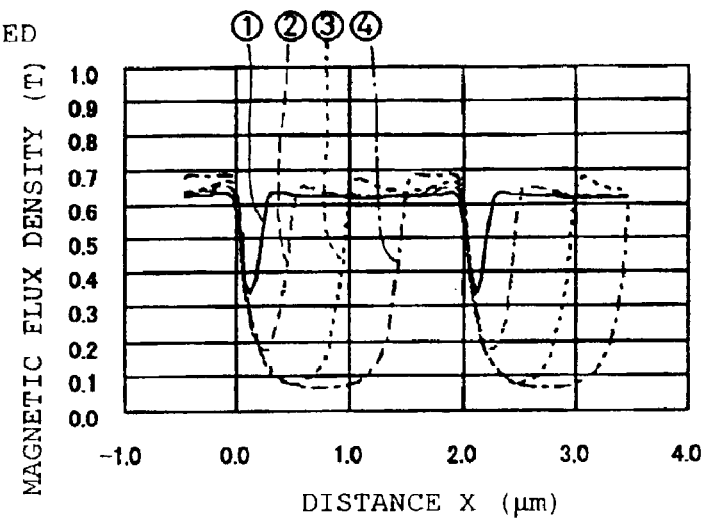
FIG. 11 is a diagram showing an example of results obtained by computer simulating magnetic flux density distributions of the surface of the magnetic recording medium supplied for the description of the manufacturing method for a magnetic recording medium according to the preferred embodiment of the present invention.

(4) When the circumferential length A of the ferromagnetic thin film 3 is too short as shown in FIG. 11, a magnetic flux is easily leaked into the contact region of the magnetic recording medium 2 closely made contact with the ferromagnetic thin film 3.

FIG. 11 shows the plotted magnetic flux densities of the surface of the magnetic recording medium 2 when fixing the circumferentially spaced length B=2 μm of the ferromagnetic thin film 3, the film thickness t=200 μm, the applied magnetic field H=1000 oersteds, the circumferential length A is changed. The horizontal axis and the vertical axis are the same as FIGS. 8 and 9. Line ① indicates the case of the circumferential length A=0.25 μm; line ② indicates the case of the circumferential length A=0.50 μm; line ③ indicates the case of the circumferential length A=1.00 μm; and line ④ indicates the case of the circumferential length A=1.50 μm.

In FIG. 11, the respective valley parts of lines ① to ④ correspond to parts in which the ferromagnetic thin film 3 of the maser information carrier 1 exists. As the circumferential length A of the ferromagnetic thin film 3 is decreased, the magnetic flux density of the contact region of the magnetic recording medium 2 is found to be increased.

From this, as the circumferential length A of the ferromagnetic thin film 3 is much decreased, it is difficult to form clear magnetization transition regions in the magnetic recording medium 2.

In summary, when the ferromagnetic thin film 3 of the master information carrier 1 is magnetically saturated, a magnetic flux is leaked from the ferromagnetic thin film 3 itself to the contact region of the magnetic recording medium 2. The clear magnetization transition regions 6a and 6b cannot appear in the contact region and the noncontact region so that satisfactory magnetic transfer cannot be performed.

Assuming this, (a) When the film thickness t of the ferromagnetic thin film 3 is small, the ferromagnetic thin film 3 is easy to magnetically saturate.

(b) When the circumferential length A of the ferromagnetic thin film 3 is too long, the ferromagnetic thin film 3 is easy to magnetically saturate.

(c) When the circumferential length A of the ferromagnetic thin film 3 is too short, the magnetic flux is easy to leak below the ferromagnetic thin film 3.

The present inventors have conducted a study based on the above results and have found that when the aspect ratio of the circumferential length A and the film thickness t of the ferromagnetic thin film 3 of the master information carrier 1 is k=A/t, the aspect ratio (k) is from not less than 0.8 to not more than 8.0 so as to permit a satisfactory magnetic disc.

Figure 12:
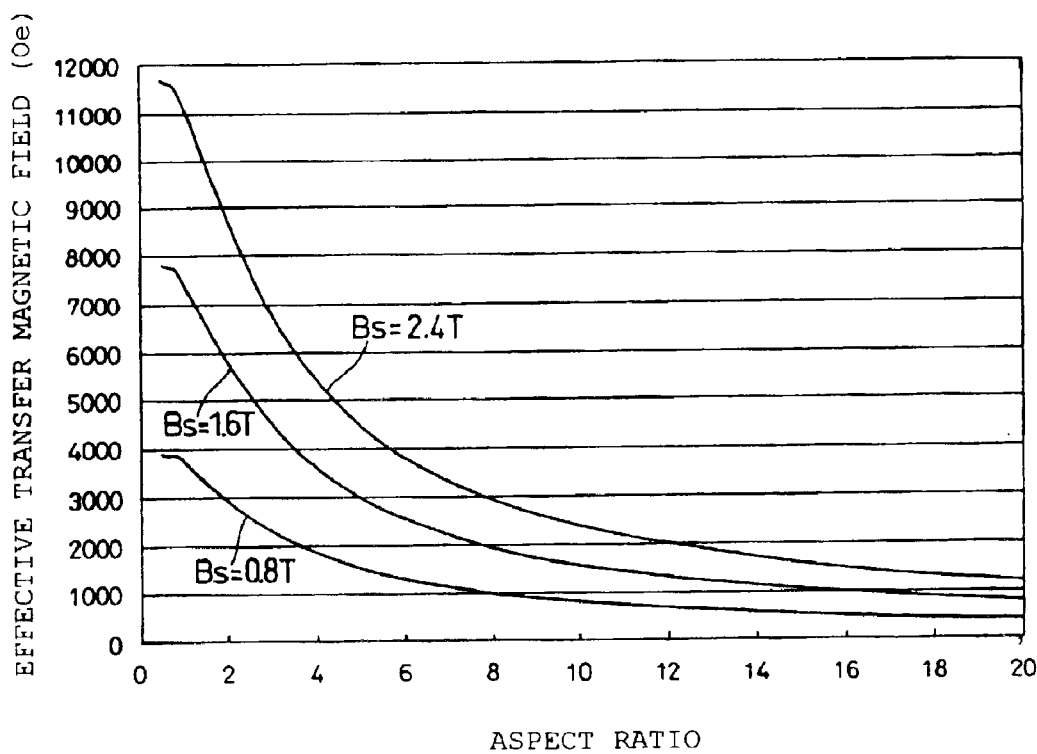
FIG. 12 is a diagram showing the relationship between the effective transfer magnetic field and the aspect ratio supplied for the description of the master information carrier according to the preferred embodiment of the present invention.

This will be described with reference to FIG. 12. In FIG. 12, the vertical axis indicates the effective transfer magnetic field (Oe) and the horizontal axis indicates the aspect ratio (k). The effective transfer magnetic field refers to a difference between the magnetic flux density in the center of the noncontact region B and the magnetic flux density in the center of the contact region A. The present inventors have ascertained that as the effective transfer magnetic field is increased, the magnetization transition regions of magnetization transfer becomes clear so that the reproducing signal quality becomes high.

In FIG. 12, the saturation magnetic flux density Bs=0.8 T indicates the case that the ferromagnetic thin film 3 as a soft magnetic material is a typical permalloy; the saturation magnetic flux density Bs=1.6 T indicates the case that the ferromagnetic thin film 3 is cobalt; and the saturation magnetic flux density Bs=2.4 T indicates the case that the ferromagnetic thin film 3 is pure iron. In any of the cases, when the aspect ratio (k) is not less than 8.0, the effective transfer magnetic field is not more than 1000 oersteds (Oe). Satisfactory magnetic transfer is hard to obtain.

The aspect ratio (k) will be considered here. In this embodiment, the circumferential length A of the ferromagnetic thin film 3 of the master information carrier 1 is fixed or almost fixed in any part of the maser information carrier 1 contacted with the magnetic recording medium 2 from the inner circumference to the outer circumference at magnetic transfer. That is, in the master information carrier 1 of this embodiment, the thickness t of the ferromagnetic thin film 3, from the inner circumference to the outer circumference of the master information carrier 1 is fixed, and the circumferential length A of the ferromagnetic thin film 3 is also substantially fixed.

Figure 13A:
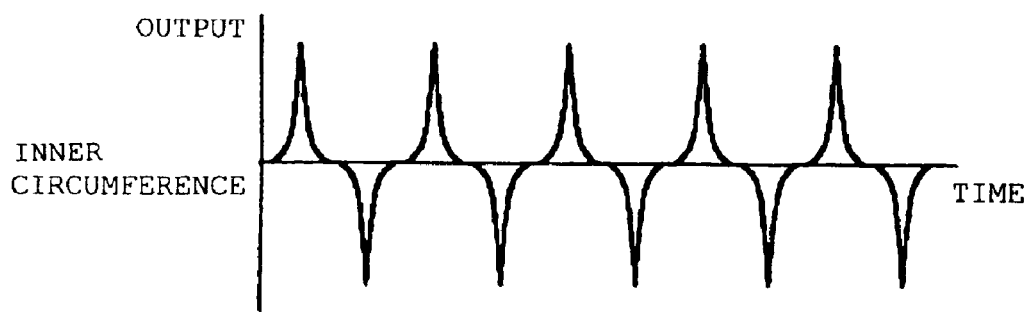
FIG. 13A is a diagram showing a reproducing signal waveform in the inner circumference of the magnetic recording medium of reproducing signal waveforms in the magnetic recording medium magnetically transferred by the master information carrier according to the preferred embodiment of the present invention.
Figure 13B:
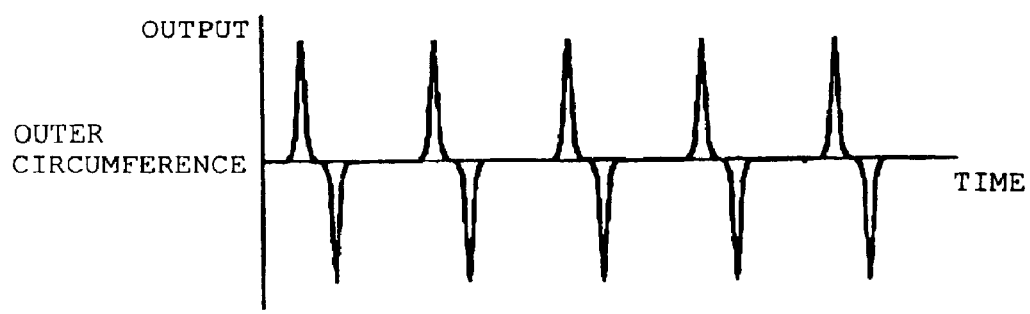
FIG. 13B is a diagram showing a reproducing signal waveform in the outer circumference of the magnetic recording medium of reproducing signal waveforms in the magnetic recording medium magnetically transferred by the master information carrier according to the preferred embodiment of the present invention.
Figure 14A:
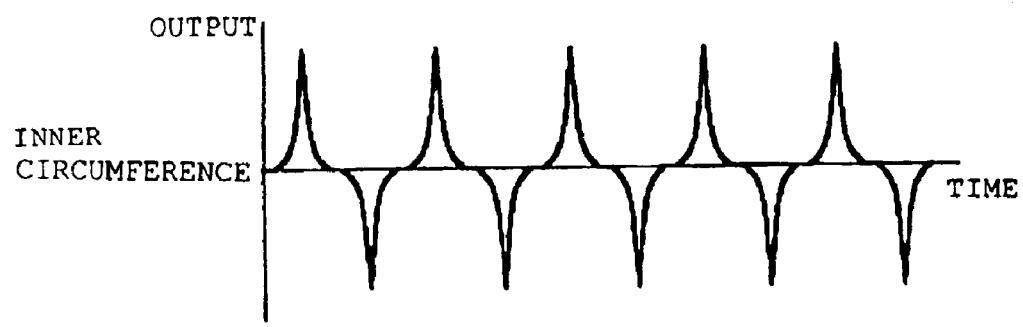
FIG. 14A is a diagram showing a reproducing signal waveform in the inner circumference of the magnetic recording medium of reproducing signal waveforms in the magnetic recording medium magnetically transferred by a conventional master information carrier.
Figure 14B:
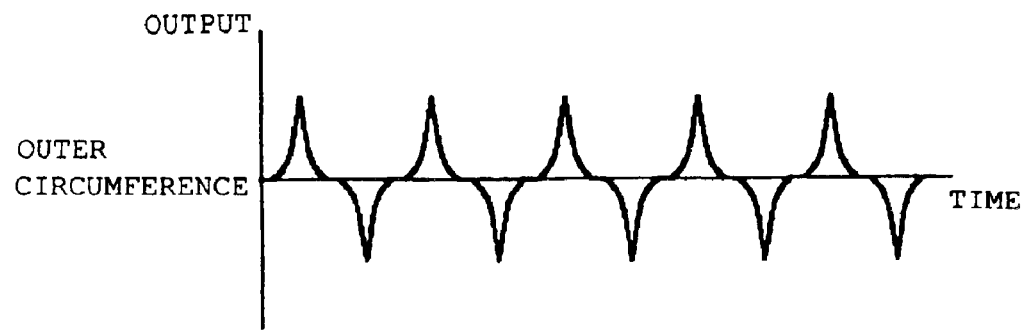
FIG. 14B is a diagram showing a reproducing signal waveform in the outer circumference of the magnetic recording medium of reproducing signal waveforms in the magnetic recording medium magnetically transferred by the conventional master information carrier.

FIG. 13 shows reproducing signal waveforms of the magnetic recording medium 2 magnetically transferred by the master information carrier 1 of this embodiment. FIG. 13A shows the reproducing signal waveform in the inner circumference of the magnetic recording medium 2. FIG. 13B shows the reproducing signal waveform in the outer circumference of the magnetic recording medium 2. As comparison, FIG. 14 shows reproducing signal waveforms of the magnetic recording medium 2 magnetically transferred by a conventional master information carrier. FIG. 14A shows the reproducing signal waveform in the inner circumference of the information recording medium 2. FIG. 14B shows the reproducing signal waveform in the outer circumference of the magnetic recording medium 2.

As is apparent from the comparison of FIGS. 13 and 14, it is found that the master information carrier 1 of this embodiment performs satisfactory magnetic transfer from the inner circumference to the outer circumference of the magnetic recording medium 2.

The present invention is not limited to the above embodiment and various applications and modifications can be considered.

(1) As another embodiment, when the circumferential speed of the radius r of the magnetic recording medium 2 is s and the pitch of the repetitive pattern of the ferromagnetic thin film 3 of the master information carrier 1 is P, the reproducing signal frequency f is f=s/P.

The rotation angular speed of the magnetic recording medium 2 is ω, the reproducing signal frequency f is f=rω/(a+B).

In order that the reproducing signal frequency may be fixed without depending on the radius r, A+B=rω/f.

The asymmetry coefficient of the pattern of the ferromagnetic thin film 3 is η=A/(A+B). From the result obtained by studying the aspect ratio k, for example, in order that the circumferential length A of the ferromagnetic thin film 3 may be kept so that the external magnetic field is not magnetically saturated below the ferromagnetic thin film 3 at above the fixed length, $$\eta = A/(A+B) = A/(r\omega/f) = (1/r)(Af/\omega) = (1/r)(af/\omega).$$

The asymmetry coefficient η may be inversely proportional to the radius r of the magnetic recording medium 2.

That is, in the master information carrier 1, the asymmetry coefficient η of the part closely made contact with the outer circumference of the magnetic recording medium 2 may be set to be smaller than that of the part closely made contact with the inner circumference of the magnetic recording medium 2.

The asymmetry coefficient η of the ferromagnetic thin film 3 of the master information carrier 1 is set in this manner. The frequency of the reproducing signal transferred onto the magnetic recording medium 2 can be fixed without depending on the radius r of the magnetic recording medium 2. A leakage flux is small below the ferromagnetic thin film 3 so as to obtain a satisfactory reproducing signal.

(2) The present invention is applied to the magnetic recording medium mounted on a magnetic recording medium drive. The present invention is not limited to this and can be applied in a magnetic recording medium such as a flexible magnetic recording medium, a magnetic card and a magnetic tape. The above-described effects of the invention can be obtained.

(3) The information signal recorded onto the magnetic recording medium 2 is described by aiming principally at a pre-format signal such as a servo signal for tracking, an address information signal and a reproducing clock signal. The information signal to which the construction of the present invention can be applied is not limited to the above description.

For example, recording various data signals and audio and video signals can be done in principle using the construction of the present invention. In this case, the magnetic recording method to the magnetic recording medium using the master information carrier of the present invention can perform mass copy production for the magnetic recording medium onto which a software program is recorded which can be provided at low cost.

Figure 15:
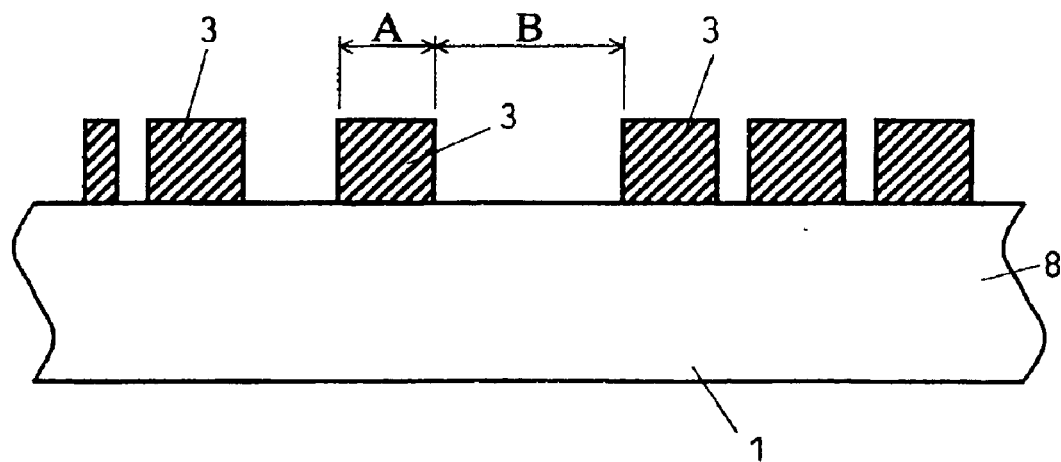
FIG. 15 is a cross-sectional view taken along line L–L' shown in FIG. 2 in another master information carrier corresponding to FIG. 3.

(4) In the present invention, in place of the master information carrier 1 shown in the above embodiment, a pattern shape made of the ferromagnetic thin film 3 on the surface of the non-magnetic substrate 8 may be arranged in a convex form, as shown in FIG. 15.

Figure 16A:
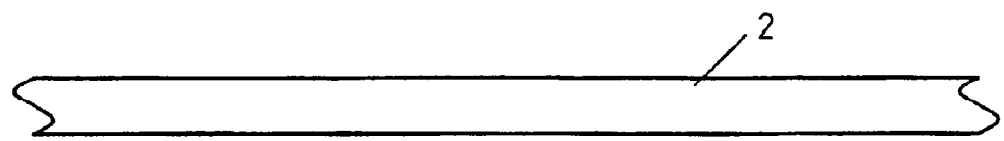
FIG. 16A is a partial cross-sectional view of the magnetic recording medium before magnetic transfer in another manufacturing method for a magnetic recording medium corresponding to FIG. 4.

(5) The present invention may perform magnetic transfer as shown in FIG. 16 in place of the magnetic transfer of FIG. 4 shown in the above embodiment. As shown in FIG. 16A, the magnetic recording medium 2 onto which control information is recorded is prepared.

Figure 16B:
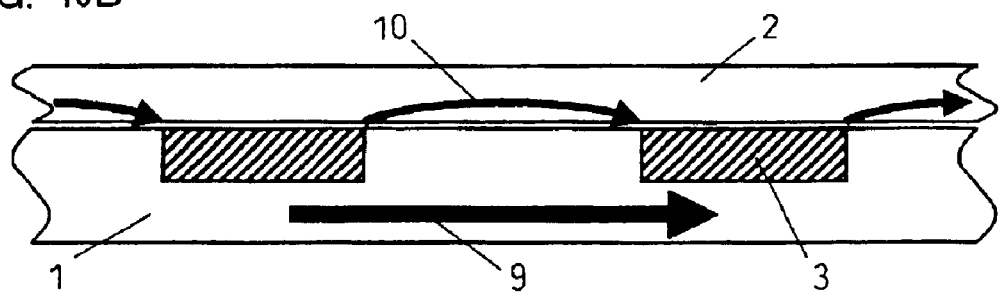
FIG. 16B is a partial cross-sectional view in a state of closely making contact the master information carrier with the magnetic recording medium in another manufacturing method for a magnetic recording medium corresponding to FIG. 4.
Figure 16C:
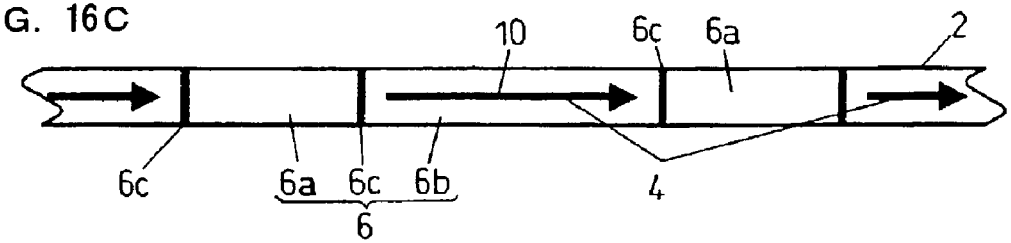
FIG. 16C is a partial cross-sectional view of the magnetic recording medium after magnetic transfer in another manufacturing method for a magnetic recording medium corresponding to FIG. 4.

As shown in FIG. 16B, the surface of the magnetic recording medium 2 is closely made contact with the surface of the master information carrier 1, and then, the magnetic field 9 indicated by an arrow is applied in this state. Upon the application of the applied magnetic field 9, the leakage flux 10 is caused in a space part without the ferromagnetic thin film 3 on the master information carrier 1. As shown in FIG. 16C, the magnetization pattern 6 corresponding to the shape pattern of the ferromagnetic thin film 3 is recorded onto the magnetic recording medium 2.

In FIG. 16C, in the magnetization pattern 6 of the magnetic recording medium 2, the unrecorded region 6a corresponding to the surface part of the ferromagnetic thin film 3 of the master information carrier 1 and the recorded region 6b onto which the magnetization 10 indicated by an arrow mark is recorded by the leakage flux 5 are arranged alternately via the magnetization transition region 6c.

Prior to the magnetic transfer, when the magnetic recording medium 2 is erased in the neutral point by alternating current erasing or thermal magnetic erasing to be a non-magnetic field, the magnetization pattern 6 as shown in FIG. 16C is recorded.

As described above, the present invention can perform satisfactory magnetic transfer from the inner circumference to the outer circumference of the magnetic recording medium. In the present invention, when a pre-format signal such as a servo signal for tracking, an address information signal and a reproducing clock signal is magnetically transferred onto the magnetic recording medium, constantly clear magnetization transition regions can be realized so as to obtain a magnetic recording medium causing no reproducing signal errors.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A manufacturing method for a magnetic recording medium, comprising the steps of:
    making contact a master information carrier having a plurality of ferromagnetic thin films in the form of an information signal provided adjacent to each other at predetermined intervals in the circumferential direction with a magnetic recording medium onto which said information signal is magnetically transferred; and allowing a leakage flux between the adjacent ferromagnetic thin films in the circumferential direction caused by an applied magnetic field to said master information carrier to magnetize said magnetic recording medium in the direction of said applied magnetic field so as to form magnetization transition regions in the circumferential direction in said magnetic recording medium, wherein when the circumferential length of the ferromagnetic thin film on said master information carrier is A, the film thickness of said ferromagnetic thin film is t and A/t is an aspect ratio, the aspect ratio is set so that an effective transfer magnetic field corresponding to a magnetic material constructing said ferromagnetic thin film is not less than 1000 oersteds.

2. The manufacturing method for a magnetic recording medium according to claim 1, wherein said aspect ratio is set from not less than 0.8 to not more than 8.0.

3. A manufacturing method for a magnetic recording medium, comprising the steps of:

making contact a master information carrier having a plurality of ferromagnetic thin films in the form of an information signal provided in the circumferential direction with a magnetic recording medium given initial magnetization in one circumferential direction; and applying a magnetic field in the other circumferential direction to said master information carrier in said contact state to magnetically transfer said information signal onto said magnetic recording medium, wherein when the circumferential length of the ferromagnetic thin film on said master information carrier is A, the film thickness of said ferromagnetic thin film is t and A/t is an aspect ratio, the aspect ratio is set so that an effective transfer magnetic field corresponding to a magnetic material constructing said ferromagnetic thin film is not less than 1000 oersteds.

4. The manufacturing method for a magnetic recording medium according to claim 3, wherein said magnetic recording medium is direct-current erased uniformly in the circumferential direction to give initial magnetization in one circumferential direction.

5. A manufacturing method for a magnetic recording medium, comprising the steps of:

making contact a master information carrier having a plurality of ferromagnetic thin films in the form of an information signal provided in the circumferential direction with a magnetic recording medium as a non-magnetic filed; and applying a magnetic field to said master information carrier in said contact state to magnetically transfer said information signal onto said magnetic recording medium, wherein when the circumferential length of the ferromagnetic thin film on said master information carrier is A, the film thickness of said ferromagnetic thin film is t and A/t is an aspect ratio, the aspect ratio is set so that an effective transfer magnetic field corresponding to a magnetic material constructing said ferromagnetic thin film is not less than 1000 oersteds.

6. A manufacturing method for a magnetic recording medium, comprising the steps of:

making contact a master information carrier having a plurality of ferromagnetic thin films in the form of an information signal provided adjacent to each other at predetermined intervals in the circumferential direction with a magnetic recording medium onto which said information signal is magnetically transferred; and allowing a leakage flux between the adjacent ferromagnetic thin films in the circumferential direction caused by an applied magnetic field to said master information carrier to magnetize said magnetic recording medium in the direction of said applied magnetic field so as to form magnetization transition regions in the circumferential direction in the magnetic recording medium, wherein when the circumferential length of the ferromagnetic thin film on said master information carrier is A, the circumferentially spaced distance between the ferromagnetic thin films is B and A/(A+B) is the asymmetry coefficient of the pattern of the ferromagnetic thin film, said asymmetry coefficient of the part closely made contact with the outer circumference of said magnetic recording medium is set to be smaller than that of the part closely made contact with the inner circumference of said magnetic recording medium.

7. A manufacturing method for a magnetic recording medium, comprising the steps of:

making contact a master information carrier having a plurality of ferromagnetic thin films in the form of an information signal provided adjacent to each other at predetermined intervals in the circumferential direction with a magnetic recording medium onto which said information signal is magnetically transferred; and allowing a leakage flux between the adjacent ferromagnetic thin films in the circumferential direction caused by an applied magnetic field to said master information carrier to magnetize said magnetic recording medium in the direction of said applied magnetic field so as to form magnetization transition regions in the circumferential direction in the magnetic recording medium, wherein the circumferential length of the ferromagnetic thin film on said master information carrier is set to be substantially the same in any part on said master information carrier closely made contact with said magnetic recording medium from the inner circumference to the outer circumference.

* * * * *

UNITED STATES PATENT AND TRADEMARK OFFICE
CERTIFICATE OF CORRECTION

PATENT NO. : 6,914,735 B2
DATED : July 5, 2005
INVENTOR(S) : Taizou Hamada et al.

It is certified that error appears in the above-identified patent and that said Letters Patent is hereby corrected as shown below:

Column 11,
Line 52, change "filed" to -- field --.

Signed and Sealed this

Eighteenth Day of October, 2005

JON W. DUDAS
*Director of the United States Patent and Trademark Office*